United States Patent [19]

Lee

[11] Patent Number: 5,710,603
[45] Date of Patent: Jan. 20, 1998

[54] METHOD FOR DETECTING MOTION VECTORS

[75] Inventor: Min-Sup Lee, Seoul, Rep. of Korea

[73] Assignee: Daewoo Electronics Co., Ltd., Seoul, Rep. of Korea

[21] Appl. No.: 498,503

[22] Filed: Jul. 5, 1995

Related U.S. Application Data

[63] Continuation-in-part of Ser. No. 133,666, Oct. 7, 1993, abandoned.

[30] Foreign Application Priority Data

Oct. 7, 1992 [KR] Rep. of Korea .................. 92-18391

[51] Int. Cl.$^6$ ................................................. H04N 7/32
[52] U.S. Cl. ................................. 348/699; 348/420
[58] Field of Search .......................... 348/384, 390, 348/400–403, 407, 409–413, 415, 416, 420, 699; 382/232, 236, 238; H04N 7/137

[56] References Cited

U.S. PATENT DOCUMENTS

| 4,937,666 | 6/1990 | Yang ............................ 348/413 |
| 5,134,477 | 7/1992 | Knauer et al. .................... 348/416 |
| 5,142,361 | 8/1992 | Tayama et al. ................... 348/699 |
| 5,200,820 | 4/1993 | Gharavi ......................... 348/416 |
| 5,257,102 | 10/1993 | Wilkinson ...................... 348/699 |

OTHER PUBLICATIONS

K. A. Prabhu et al., "Pel–Recursive Motion Compensation Color Coding", Proceedings of ICC 88, pp.2G.8.1–2G.8.5, Jun. 1982.

Netravali et al, "Motion–Compensated Television Coding: Part I", The Bell System Technical Journal, vol. 58, No. 3, pp. 631–670, Mar. 1979.

J. R. Jain et al, "Displacement Measurement and its Application Interframe Image Coding," IEEE Transactions on Communications, COM–29, No. 12, pp. 1799–1808, Dec. 1981.

Kim et al, "A Fast Feature–Based Block Matching Algorithm Using Integral Projections", IEEE Journal on Selected Areas in commuications, vol. 10, No. 5, pp. 968–971, Jun. 1992.

*Primary Examiner*—Richard Lee
*Attorney, Agent, or Firm*—William F. Pinsak

[57] ABSTRACT

A method for determining a set of motion vectors between a current frame and a reference frame of video signals, which comprises the steps of: (a) one dimensionally comparing a search block from the current frame with said plurality of candidate blocks included in a search region corresponding to the search block, on a block-by-block basis, by employing a one-dimensional error function using horizontal and vertical integral projections to select a predetermined number of candidate blocks in an ascending order of the one-dimensional error; (b) two dimensionally comparing the search block with the predetermined number of candidate blocks selected in step(a) above, on a block-by-block basis, by employing a two-dimensional error function to thereby select a most similar candidate block and derive a motion vector representing the displacement of pixels between the search block and the most similar candidate block so as to assign the derived motion vector as the motion vector for the search block; and (c) repeating steps (a) and (b) until all of the search blocks constituting the current frame are searched against the entire reference frame, to thereby derive a set of motion vectors.

3 Claims, 4 Drawing Sheets

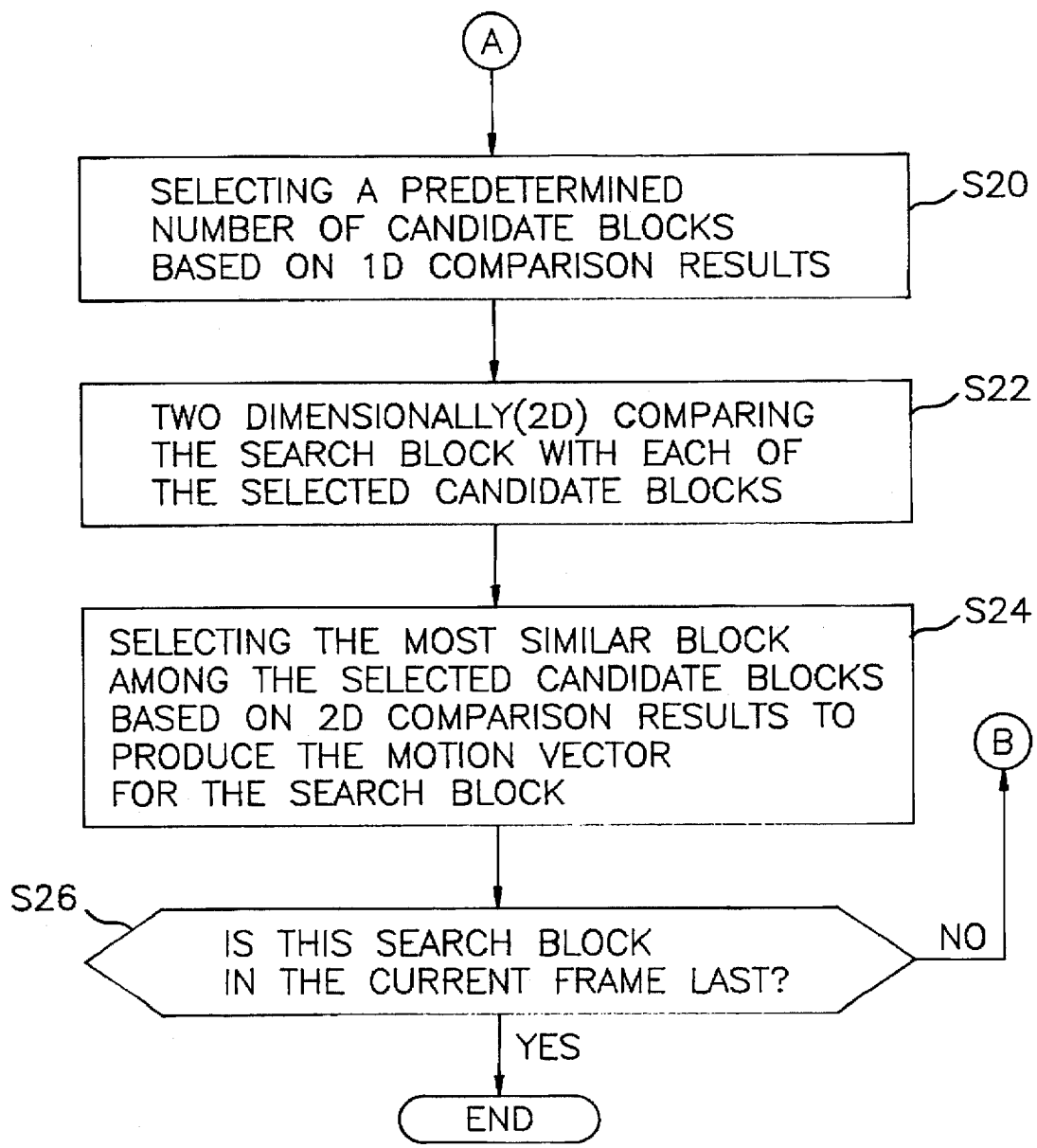

METHOD FOR DETECTING MOTION VECTORS

CROSS REFERENCE TO RELATED APPLICATION

This application is a continuation-in-part of U.S. Ser. No. 08/133,666 filed on Oct. 7, 1993, now abandoned.

FIELD OF THE INVENTION

The present invention relates to an improved method for approximating motion vectors between two successive frames of video signals; and, more particularly, to an improved method for accurately determining the motion vectors and reducing the computational complexity involved in the motion vector estimation through the use of one-dimensional and two-dimensional similarity calculations in sequence.

DESCRIPTION OF THE PRIOR ART

In digital processing systems such as video-telephone, teleconference and high definition television systems, a large amount of digital data is required to define each frame of video signals since each line of an image frame comprises a sequence of digital data referred to as pixels. However, the available frequency bandwidth of a conventional transmission channel to transmit the data is limited. Therefore, it has become necessary to reduce the substantial amount of data by way of employing various data compression techniques.

Interframe coding technique is one of the effective coding methods to compress data in video sequences. Motion-compensated coding, especially, can further improve the efficiency of image coding for the transmission of compressed data which is normally used to predict current frame data from previous frame data based on an estimation of the motion between the current and the previous frames. Such estimated motion may be described in terms of two dimensional motion vectors representing the displacement of pixels between the previous and the current frames.

Several methods for estimating the displacement of an object in a video sequence have been proposed. Generally, they can be classified into two types: pixel recursive algorithm(see, e.g., A. N. Netravali et al., "Motion Compensated Television Coding: Part I", *BSTJ*, 58, pp. 631–670 (March 1979); and K. A. Prabhu et al., "Pel-Recursive Motion Compensated Color Coding", *Proceedings of ICC 88*, pp. 2G.8.1–2G.8.5 (June 1982); and block matching algorithm (see, e.g., J. R. Jain et al., "Displacement Measurement and Its Application in interframe Image Coding", *IEEE Transactions on Communications*, COM-29, No. 12, pp. 1799–1808 (December 1981)). The present invention is primarily concerned with the block matching algorithm.

In the block matching algorithm, a current frame is divided into a plurality of search blocks. To determine a motion vector for a search block in the current frame, a similarity calculation is performed between the search block of the current frame and each of a plurality of equal-sized candidate blocks included in a generally larger search region within a previous frame. An error function such as the mean absolute error or mean square error is used to carry out a similarity measurement between the search block of the current frame and one of the candidate blocks in the search region. And a motion vector, by definition, represents the displacement between the search block and a candidate block which yields a minimum "error" or difference. Since the search block is compared with all possible candidate blocks within a search region corresponding to the search block(full search block matching), there normally occurs a heavy computational requirement.

In light of the severe computational burden in the full search block matching procedure, simplified algorithms have been proposed(see, e.g., J. R. Jain et al., "Displacement Measurement and Its Application in Interframe Image Coding", *IEEE Transactions on Communications*, Com-29, No. 12, pp. 1799–1808 (December 1981)). The simplified algorithm proposed by Jain et al., utilizes a plurality of candidate blocks located at predetermined positions in a search region. Although this simplified searching method reduces the computational burden, it does not necessarily provide an optimal implementation of the block matching algorithm.

Recently, another fast block matching algorithm employing an integral projection concept has been presented (see, e.g., Joon-Seek Kim et al, "A Fast Feature-Based Block Matching Algorithm Using Integral Projections", *IEEE Journal on Selected Areas in Communications*, 10, No. 5, pp. 968–971 (June 1992)). This method reduces the motion estimation computation by employing a one-dimensional error function instead of a two-dimensional error function. The one-dimensional error function uses an integral projection which is defined to be a one-dimensional integration or sum of the luminance levels of those pixels lying along a fixed directional line in an image block. Although this method may reduce the computational complexity, it cannot always provide an accurate motion vector.

SUMMARY OF THE INVENTION

It is, therefore, a primary object of the present invention to provide an improved method which is capable of determining motion vectors with an enhanced accuracy between two successive frames of video signals and reducing the computational complexity by carrying out a one-dimensional similarity calculation followed by a two-dimensional similarity computation.

In accordance with one aspect of the invention, there is provided a method for determining a set of motion vectors between a current frame and a reference frame of video signals, wherein the current frame is divided into a number of search blocks of an identical size and the reference frame is made to include a corresponding number of search regions, each search region having a plurality of candidate blocks of said identical size, which comprises the steps of:

(a) one dimensionally comparing a search block from the current frame with said plurality of candidate blocks included in a search region corresponding to the search block, on a block-by-block basis, by employing a one-dimensional error function using horizontal and vertical integral projections to select a predetermined number of candidate blocks in an ascending order of the one-dimensional error function;

(b) two dimensionally comparing the search block with the predetermined number of candidate blocks selected in step(a) above, on a block-by-block basis, by employing a two-dimensional error function to thereby select a most similar candidate block to the search block and derive a motion vector representing the displacement of pixels between the search block and the most similar candidate block so as to assign the derived motion vector as the motion vector for the search block; and (c) repeating steps (a) and (b) until all of the search blocks constituting the current frame are searched against the entire reference frame, to thereby derive a set of motion vectors.

BRIEF DESCRIPTION OF THE DRAWINGS

The above and other objects and features of the present invention will become apparent from the following description of preferred embodiments taken in conjunction with the accompanying drawings, in which:

FIGS. 3A and 3B represent flow charts explaining the algorithm of determining motion vectors in accordance with the invention.

DETAILED DESCRIPTION OF THE PREFERRED EMBODIMENTS

Figure 1:
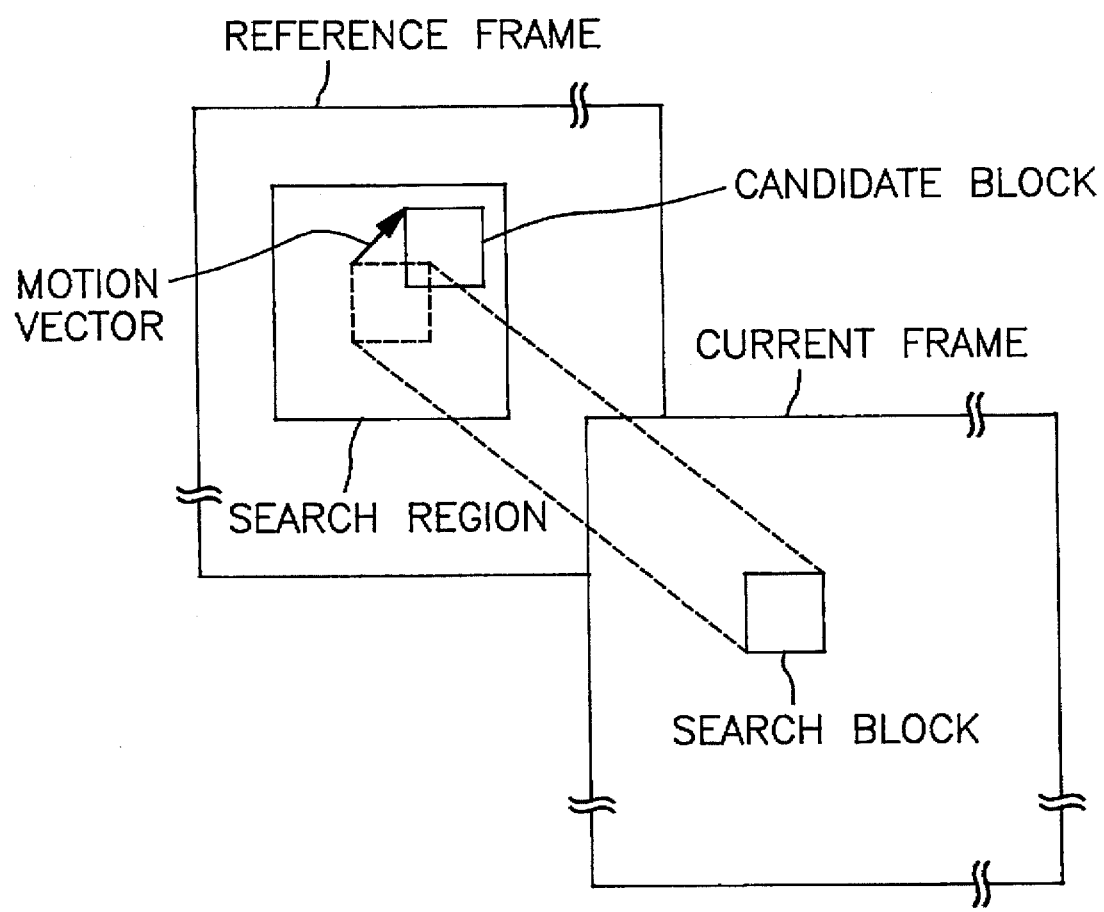
FIG. 1 schematically illustrates a sequence of video frames and their elements.

FIG. 1 schematically shows a sequence of a current frame and a reference frame(adjacent or previous frame) to be transmitted from a transmitter(not shown) to a receiver(not shown). Generally, an interframe coding technique using motion estimation and compensation employed to achieve a significant data compression by taking advantage of the redundancies present in the successive frames. That is to say, if the difference between the current frame and the reference frame is induced by the displacement or motion of an object and this difference is confined to a relatively small region within each frame, it is not necessary to transmit the entire image data of the current frame to the receiver. Instead, it is only necessary to transmit the displacement information, i.e., motion vectors to the receiver. The receiver then reconstructs the current frame from its reference frame whose image data is already stored in a frame memory within the receiver, utilizing the motion vectors.

As shown in FIG. 1, to determine such motion vectors by using the block matching algorithm, the current frame is divided into a plurality of search blocks of an identical size, each comprising M×N pixels. For the purpose of illustration, it is assumed that M and N are both an equal number of 8 for each search block of pixels in the current frame. And its reference frame includes a corresponding number of search regions(normally, once a search block in the current frame is selected, one can readily identify a search region in the reference frame corresponding thereto); and each search region is made to have a multiplicity of candidate blocks of the identical size, with some or all of the candidate blocks likely to have certain overlapping portions with their neighbors.

To determine the motion vector for a given search block from the current frame, the search block is compared with all of the candidate blocks included in the corresponding search region, on a block-by-block basis, to calculate the similarities therebetween. In this invention, in carrying out the similarity measurement, a one-dimensional error function and a two-dimensional error function are employed in sequence.

Figure 2:
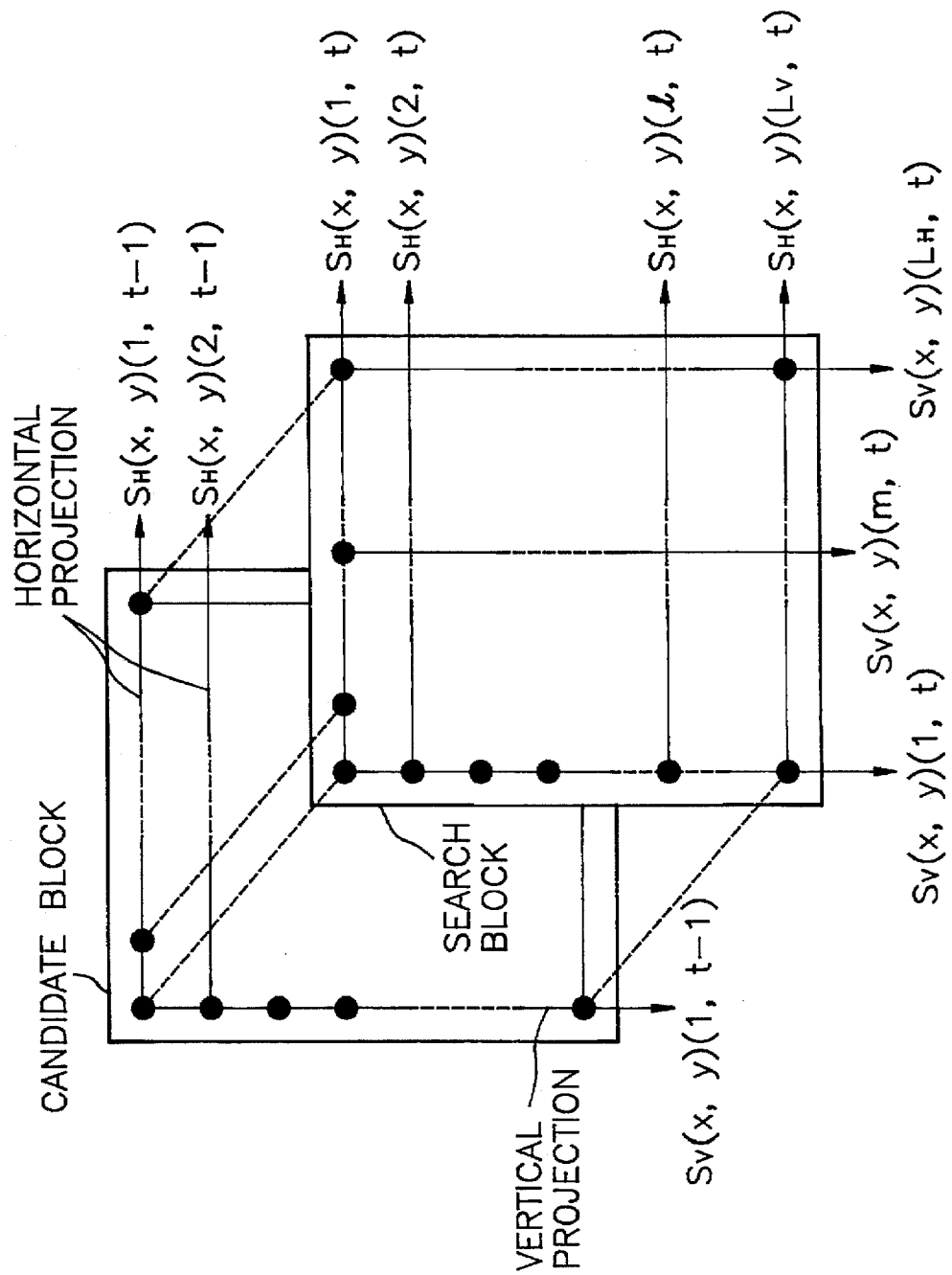
FIG. 2 presents two exemplary blocks for describing a one-dimensional error function and a two-dimensional error function.

Referring to FIG. 2, there are depicted two exemplary blocks for describing a one-dimensional error function and a two-dimensional error function. The one-dimensional error function utilizes the concept of integral projections. An integral projection is defined as a summation value of the luminance levels of all the pixels lying along a horizontal or a vertical pixel line in a given block. As shown in FIG. 2, there may be a number of horizontal integral projections $S_H(x,y)$ and a number of vertical integral projections $S_V(x,y)$ in a search or a candidate block. The one-dimensional error function using the horizontal and the vertical integral projections is defined by the following Eq. (1):

$$C_1 = \sum_{l=1}^{L_V} |S_H(x,y)(l,t) - S_H(x,y)(l,t-1)| + \sum_{m=1}^{L_H} |S_V(x,y)(m,t) - S_V(x,y)(m,t-1)| \quad \text{Eq. (1)}$$

wherein $C_1$ is the one-dimensional error function, $L_V$ and $L_H$ denote the number of pixels lying along a vertical pixel line and a horizontal pixel line in a search or a candidate block, $S_H(x,y)(l,t)$ and $S_V(x,y)(m,t)$ represent a horizontal and a vertical integral projections at a position (x,y) in the search block, $S_H(x,y)(l, t-1)$ and $S_V(x,y)(m,t-1)$ illustrate a horizontal and a vertical integral projections at the position (x,y) in the candidate block.

On the other hand, two-dimensional error functions are more frequently used; and a typical two-dimensional error function is the Mean Absolute Error(MAE) function. The MAE is often used because it offers a good trade-off between complexity and efficiency. The MAE function $C_2$ between a search block and a candidate block may be defined as follows:

$$C_2 = \frac{1}{L_H L_V} \sum_{i=1}^{L_V} \sum_{j=1}^{L_H} |A(i,j) - B(i,j)| \quad \text{Eq. (2)}$$

wherein $A(i,j)$ and $B(i,j)$ represent the luminance levels of the pixels situated at the intersection of row i and column j in the search block and the candidate block, respectively.

Figure 3A:
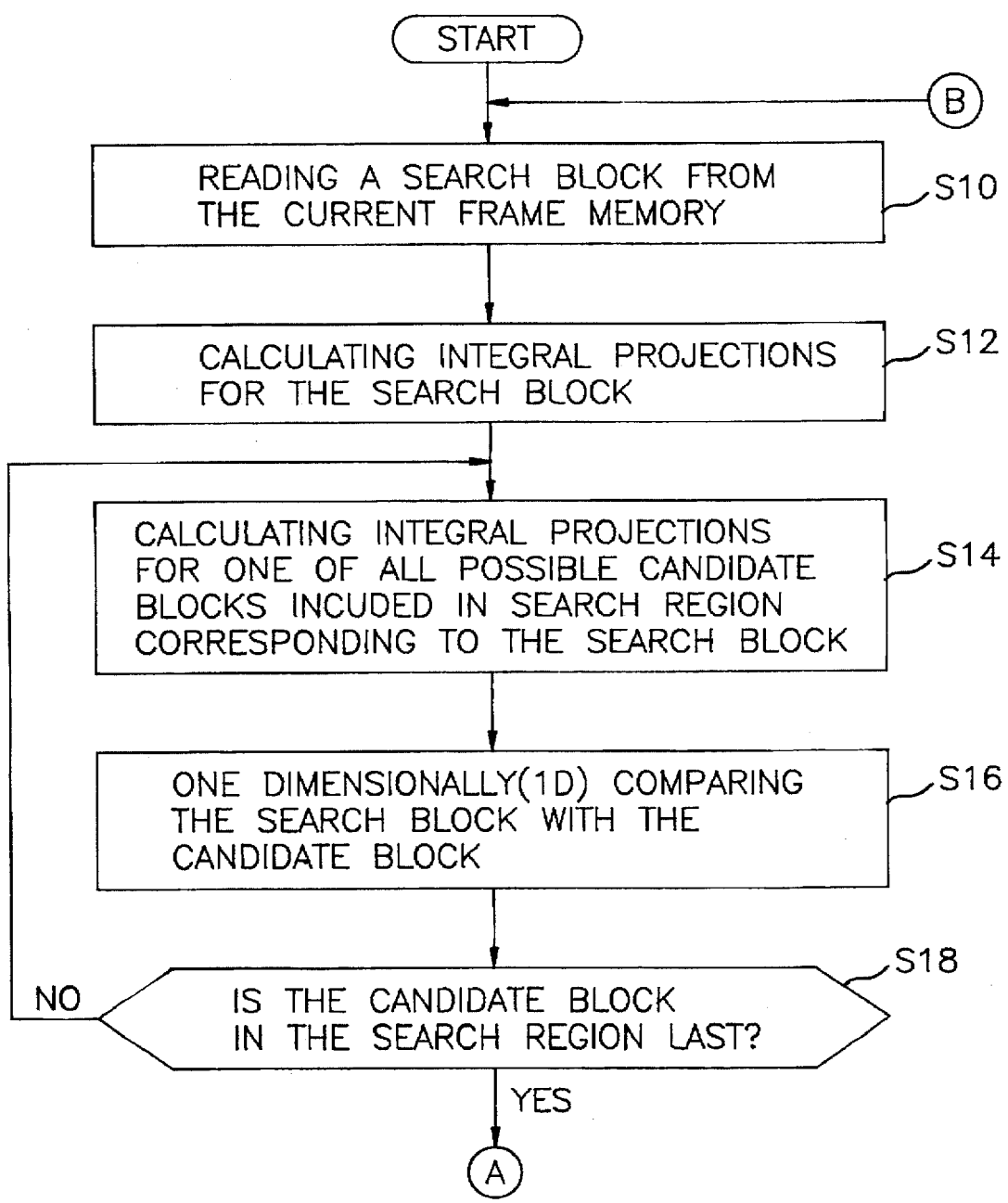

FIGS. 3A and 3B are flow charts illustrating the inventive method of determining motion vectors between a current frame and its reference frame. In step S10, a new search block is retrieved from a current frame memory storing the current frame data. In step S12, horizontal integral projections $S_H(x,y)$ (l,t) and vertical integral projections $S_V(x,y)$ (m,t) for the search block are calculated. In step S14, the horizontal integral projections $S_H(x,y)(l,t-1)$ and vertical integral projections $S_V(x,y)(m,t-1)$ are calculated for one of all possible candidate blocks which are included in a search region corresponding to the search block. In step S16, the search block and one of the candidate blocks are one-dimensionally compared: that is, the error between the search block and said one of the candidate blocks is calculated by using the one-dimensional error function $C_1$ described above. In step S18, It is checked whether said one of the candidate blocks is the last candidate block in the search region. If it is not, steps S14 and S16 are repeated for all of the remaining candidate blocks. If the last candidate block is reached, in step 20, a predetermined number of candidate blocks having a smallest error are selected. In step S22, the search block and each of the selected candidate blocks are two dimensionally (2D) compared by using the two-dimensional error function $C_2$ described above. In step S24, the most similar candidate block, i.e., the one with the least error value, is selected among the selected candidate blocks based on the 2D comparison results, to thereby define the motion vector for the search block. In step S26, it is determined whether the search block is the last one in the current frame. If it is not, steps S10 to S24 are repeated until the last search block is processed.

While the present invention has been described with reference to the particular embodiments, it will be apparent to those skilled in the art that various changes and modifications may be made without departing from the spirit and scope of the invention as defined in the following claims.

What is claimed is:

1. A method determining a set of motion vectors between a current frame and a reference frame of video signals, wherein the current frame is divided into a number of search blocks of an identical size and the reference frame is made to include a corresponding number of search regions, each search region having a plurality of candidate blocks of said identical size, which comprises the steps of:

(a) one dimensionally comparing a search block from the current frame with said plurality of candidate blocks included in a search region corresponding to the search block, on a block-by-block basis, by using a one-dimensional error function using horizontal and vertical integral projections to select a predetermined number of candidate blocks in an ascending order of the one-dimensional error function, wherein said step(a) includes the steps of:

(a1) calculating integral projections of luminance levels of pixels in the search block;

(a2) calculating integral projections of luminance levels of pixels in one of the candidate blocks included in the search region corresponding to the search block;

(a3) comparing the search block with said one of the candidate blocks based on the integral projections calculated in steps(a1) and (a2) above;

(a4) repeating said steps (a2) and (a3) until all of the candidate blocks included in the search region corresponding to the search block are compared with the search block; and (a5) selecting a predetermined number of candidate blocks in the ascending order of the one-dimensional error function based on the comparisons made in steps (a3) and (a4) above;

(b) two dimensionally comparing the search block with the predetermined number of candidate blocks selected in step(a) above, on a block-by-block basis, by using a two-dimensional error function to thereby select a most similar candidate block and derive a motion vector representing the displacement of pixels between the search block and the most similar candidate block so as to assign the derived motion vector as the motion vector for the search block; and (c) repeating steps (a) and (b) until all of the search blocks constituting the current frame are searched against an entire reference frame, to thereby derive a set of motion vectors.

2. The method in accordance with claim 1, wherein the one-dimensional error function using the horizontal and the vertical integral projections is defined as:

$$C_1 = \sum_{l=1}^{L_V} |S_H(x,y)(l,t) - S_H(x,y)(l,t-1)| + \sum_{m=1}^{L_H} |S_V(x,y)(m,t) - S_V(x,y)(m,t-1)|$$

wherein $C_1$ is a one-dimensional error function; $L_V$ and $L_H$ denote the number of pixels lying along a vertical pixel line and a horizontal pixel line in a search or a candidate block, respectively; $S_H(x,y)(l,t)$ and $S_V(x,y)(m,t)$ represent a horizontal and a vertical integral projections at a search block position (x,y) of the current frame (t), respectively; and $S_H(x,y)(l,t-1)$ and $S_V(x,y)(m,t-1)$ illustrate a horizontal and a vertical integral projections at a candidate block position (x,y) of the reference frame (t-1), respectively.

3. The method in accordance with claim 2, wherein two-dimensional error functions between a search block and a candidate block is defined as:

$$C_2 = \frac{1}{L_H L_V} \sum_{i=1}^{L_V} \sum_{j=1}^{L_H} |A(i,j) - B(i,j)|$$

wherein $C_2$ is the two-dimensional error function; $L_V$ and $L_H$ denote the number of pixels lying along a vertical pixel line and a horizontal pixel line in a search or a candidate block, respectively; and $A(i,j)$ and $B(i,j)$ represent the luminance levels of the pixels situated at the intersection of row i and column j in the search block and the candidate block, respectively.

* * * * *